J. B. Eads' Device for Storing-up and Utilizing the Recoil of Heavy Guns

A

4471

REISSUED JUL 18 1871

Attest
Jas. L. Ewin
Walter Allen

Inventor.
James B. Eads
By Knight Bros. Attys.

UNITED STATES PATENT OFFICE.

JAMES B. EADS, OF ST. LOUIS, MISSOURI.

IMPROVEMENT IN GUN-CARRIAGES.

Specification forming part of Letters Patent No. 93,691, dated August 17, 1869; reissue No. 4,471, dated July 18, 1871.

DIVISION A.

*To all whom it may concern:*

Be it known that I, JAMES B. EADS, of St. Louis, in the county of St. Louis and State of Missouri, have invented a new and Improved Device for Storing up and Utilizing the Recoil of Heavy Guns; and I do hereby declare the following is a full, clear, and exact description thereof, which will enable others skilled in the art to make and use the same, reference being had to the accompanying drawing forming part of this specification.

Figure 1:
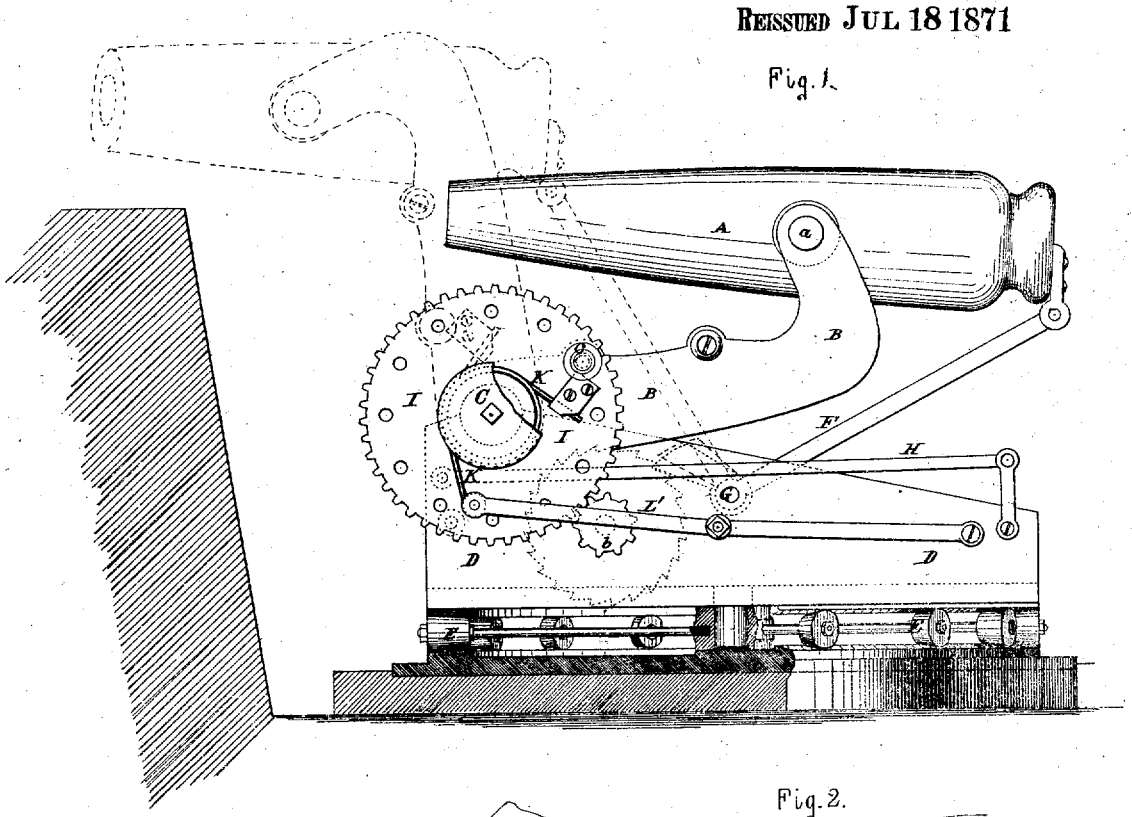
Figure 2:
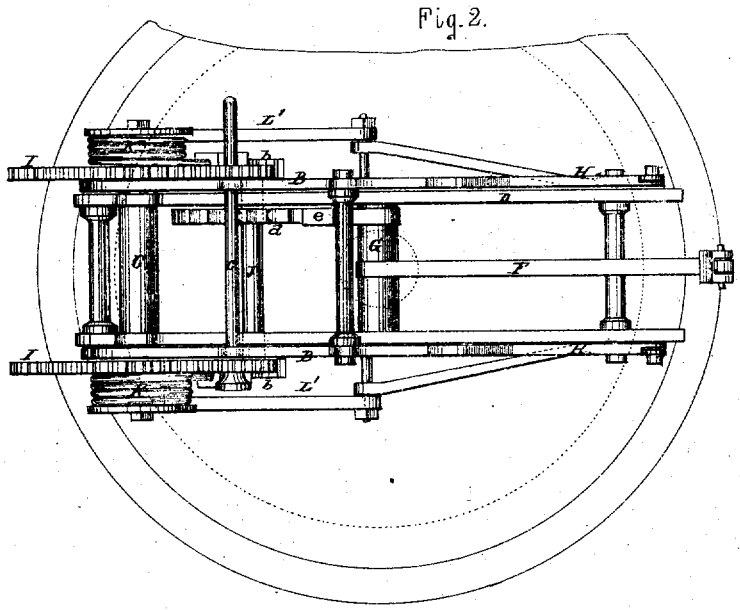

Figure 1 represents a side elevation, partly in section, of my improved device for storing up and utilizing the recoil of heavy guns, the broken outlines indicating the position of the parts when the gun is in position for firing. Fig. 2 is a plan or top view of the carriage, the parts being in the loading position.

This invention relates to storing up the power developed in the recoil of large guns, so that it may be afterward utilized, at the will of the operator, to run the gun into battery or to raise it above a parapet or other defense to admit firing over the same. The invention consists principally in causing the force of recoil to compress metallic springs, by whose elasticity the gun may at will be run forward or elevated to bring it into position for firing. The force of the recoil is so considerable that, leaving sufficient allowance for loss by friction, it will be powerful enough to elevate the gun to its position before firing. This can be proved by causing a pivoted frame in which the gun is hung to strike an elastic cushion during the recoil; the cushion, being compressed by the concussion, will at once expand and throw the gun forward. In fact, the power accumulated by a falling body would alone suffice to re-elevate it to its original position, if it were not for the resistance of the air and other friction to which it may be subjected. The reacting force of the explosive compound in the gun is, therefore, not the only motor, but an auxiliary means for obtaining the desired result.

In order to carry my invention into operation many different methods may be employed. The one shown represents the application of spring-power.

The gun A, which is of suitable form and construction, is represented as being hung with its trunnions *a* in a frame, B, which is, at its lower end, pivoted by a cross-shaft, C, to the front part of the frame D. This frame D can be made stationary, or can be placed upon a rotating platform on rollers E, to allow the gun to be pointed in either direction. The breech-end of the gun is, by means of a jointed rod, F, connected with a suitable cross-bar, G, of the frame D. This cross-bar may be arranged up and down adjustable to regulate the inclination of the gun in the firing position. When the gun is in its firing position, as indicated by broken outlines in Fig. 1, the frame B is in a vertical or forwardly-inclined position. When the gun is fired the power of the recoil forces it, with the frame B, backward, causing it to swing on the shaft C. The force of the recoil throws the frame B upon two spring-cushions, H H, which are arranged on the sides of the frame D, and which prevent injury of the parts by too sudden concussion. The cross-shaft C carries, at or near its ends, toothed wheels I I, which mesh into pinions *b b*, that are mounted on the ends of the transverse shaft J, which has its bearings in the frame D. When the frame B is, by a transverse pin, *c*, or otherwise, connected with the wheels I, it will, when swung back by the recoil, turn said wheels backward, and thereby revolve the axle J. On the latter is mounted a ratchet-wheel, *d*, into which a pawl, *e*, pivoted to the frame D, falls. K K are coiled springs. Each of them has one end fastened to one of the wheels I, and the other end attached to a pivoted lever, L′, or to some other part of the frame D, and is wound around a drum formed on the end of the cross-bar C, as shown.

As the gun is thrown back by the recoil the springs are wound up by the turning of the wheels I, and are then locked in the wound-up position by the ratchet-pawl *e*. The pawl then serves to retain or store up the force of the recoil by holding the springs in the wound-up position. At any time when the gun is loaded and ready for action the power thus stored up can be untilized by raising the pawl off the ratchet-wheel, when the springs will unwind and throw the cannon forward.

Having thus described my invention, I claim herein as new and desire to secure by Letters Patent—

1. The improved device above described, or its equivalent, for utilizing the recoil of heavy guns, consisting of the vibrating frame B, shaft C, gears I I, springs K K, pinions *b b*, shaft J, ratchet *d*, and pawl *e*, all substantially as shown and set forth.

2. The above device, in combination with springs H H arranged on the frame D, as and for the purpose specified.

In testimony of which invention I hereunto set my hand.

JAS. B. EADS.

Witnesses:

SAML. KNIGHT,

GEO. C. FABIAN.